United States Patent [19]

Laussermair et al.

[11] Patent Number: 4,462,391
[45] Date of Patent: Jul. 31, 1984

[54] RADIATION RECEIVER

[75] Inventors: Friedrich Laussermair, Krailling; Michael Simon, Munich, both of Fed. Rep. of Germany

[73] Assignee: M.A.N Maschinenfabrik Augsburg-Nurnberg Aktiengesellschaft, Munich, Del.X

[21] Appl. No.: 245,439

[22] Filed: Mar. 19, 1981

[30] Foreign Application Priority Data

Mar. 21, 1980 [DE] Fed. Rep. of Germany ....... 3010882

[51] Int. Cl.³ ................................................ F24J 3/02
[52] U.S. Cl. ..................................... 126/432; 126/439; 126/451
[58] Field of Search ............... 126/450, 439, 449, 448, 126/451, 432; 350/106, 109

[56] References Cited

U.S. PATENT DOCUMENTS

| 4,019,496 | 4/1977 | Cummings | 126/441 |
| 4,106,479 | 8/1978 | Rogers | 126/439 |
| 4,222,373 | 9/1980 | Davis | 126/450 |
| 4,321,910 | 3/1982 | Devienne | 126/439 |

*Primary Examiner*—Albert J. Makay
*Assistant Examiner*—Henry Bennett
*Attorney, Agent, or Firm*—Scully, Scott, Murphy and Presser

[57] ABSTRACT

A radiation receiver which includes a hollow body having an opening for the inlet of radiation, and a ceramic absorber arranged within the hollow body adapted to absorb the radiation energy received through the opening and to deliver it to a heat carrier medium in the form of thermal radiation.

8 Claims, 9 Drawing Figures

RADIATION RECEIVER

BACKGROUND OF THE INVENTION

1. Field of the Invention

The present invention relates to a radiation receiver which includes a hollow body having an opening for the inlet of radiation, and a ceramic absorber arranged within the hollow body adapted to absorb the radiation energy received through the opening and to deliver it to a heat carrier medium in the form of thermal radiation.

2. Discussion of the Prior Art

For high-powered solar collectors for focused sun beams, it had already been previously proposed that the absorbers which receive the heavily intensified solar energy be produced of ceramic in order to avoid any damage to the absorber as a result of excess temperatures as a result of the highly concentrated solar radiation.

A radiation receiver of that type can receive the necessary energy for high-powered installations, in which there should be generated usable temperatures of up to 1000° C. and in special instance, up to about 1500° C., with corresponding heating of the absorber. However, at a rising surface temperature of the absorber, there is also increased the radiation, causing a portion of the received energy to be reflected unused.

SUMMARY OF THE INVENTION

Accordingly, it is a primary object of the present invention to provide an improved radiation receiver of the above type which operates at an enhanced degree of efficiency.

It is a more specific object of the present invention to provide an absorber which, on the side thereof facing towards the solar radiation, consists of a ceramic material having low emission and high absorption values and which, on the side facing towards the heat carrier medium, exhibits a ceramic material having high emission and low absorption values.

In this manner there is achieved that the reflected radiation is reduced in the region of the openings in the hollow body, and that there is increased the receipt of the solar energy entering the hollow body. The improved radiation on the rear side not only improves the heat transfer to the heat carrier medium but also the further conductance of the energy absorbed in the components which are exposed to the sun rays.

An absorber of that type can be manufactured in a composite construction, or through the application of suitable ceramic materials on a ceramic basic member by vapor desposition, deposition or sintering processes.

The foregoing object can also be achieved in that the irradiated ceramic surface area of the absorber can be considerably enlarged by agglomeration where inclined areas, preferably positioned at an acute angle to the incident light, increase the absorption through multiple reflection. This construction also provides the added effect that the radiant energy is distributed over the large surface area, and thereby the temperature of the ceramic surface and, resultingly the amount of unused reflected radiation is reduced.

An increase in the absorber surface area without expansion of the projected surface can be advantageously achieved in that the absorber is constructed in the shape of one or more pyramids whose points face towards the sun rays.

In a further embodiment of the present invention the absorber is manufactured as a grid formed of ceramic tubes or rods, behind which the heat carrier medium is conducted in conduits arranged in parallel with the plane of the grid.

In another embodiment of the present invention, the absorber has a cavity on the side thereof which is exposed to the sun rays, in which at least the side walls of the cavity are formed so as to absorb as large a component as possible of the radiation reflected from the rear side.

BRIEF DESCRIPTION OF THE DRAWINGS

Reference may now be had to the following detailed description of preferred embodiments of the invention shown in schematic arrangements, taken in conjunction with the accompanying drawings; in which.

DETAILED DESCRIPTION

Figure 1:
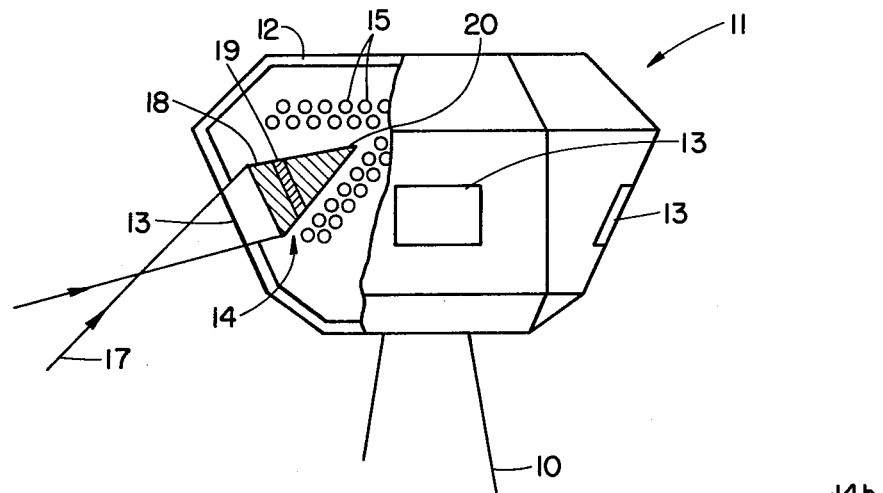
FIG. 1 illustrates, partly in section, a radiation receiver pursuant to the invention.

FIG. 1 illustrates a radiation receiver 11 mounted on a tower 10, which includes a polygonal hollow body 12 having lateral side surfaces each of which incorporates an opening 13 for the inlet of radiation. Arranged within the hollow body 12, behind each opening 13, is an absorber 14 and conduits 15 conveying a liquid or gaseous thermal medium or heat carrier. The absorber 14 is constituted of a ceramic composite material pyramid, the base 18 of which faces towards the solar rays 17, and which consists of a material of high absorption and low emission values.

The ceramic base 18 is bonded by means of an adhesive layer 19 to a second ceramic component 20 having low absorption and high emission values. This absorber ensures adequate absorption of the incident radiation energy, whereby the amount of reflected radiation through opening 13 is small due to the low emission value. The heat transmitted to the second component 20 is radiated therefrom and conducted to the heat carrier conduits 15.

Figure 2:
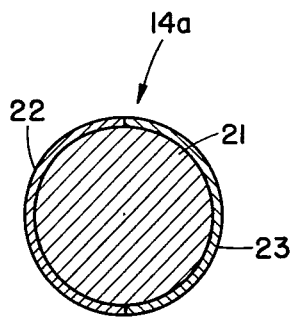
FIGS. 2 to 8 each, respectively, illustrate an embodiment of an inventive absorber.

The high degree of efficiency achieved by an absorber of that type can also be achieved using similar absorbers of different configurations or designs. FIG. 2 illustrates another embodiment in which the absorber 14a is spherically-shaped and formed from a base member 21 of ceramic material. Provided on both halves of the base member 21 are differing surface layers 22 and 23 which applied by vapor deposition, deposition or sintering having targeted absorption and emission values.

Figure 3:
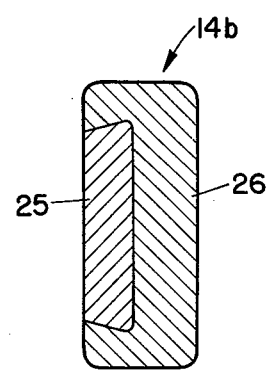

The absorber, which consists of different ceramic materials, optionally, can also consist of different components 25, 26 of interlocking construction as illustrated, for example, in FIG. 3. The shape, and the manner of manufacture of the absorber, can be adapted to optionally conform to current needs and requirements. Absorbers of this type can be imparted any desirable shape.

An increase in the degree of efficiency of a radiation receiver can also be achieved by imparting to the absorber an interboxed or agglomerated construction, in which the incident sun rays find a large effective area, and wherein the agglomerated or boxed wall members are so oriented that the heat radiation from one wall can be absorbed by an oppositely located or other wall.

Figure 4:
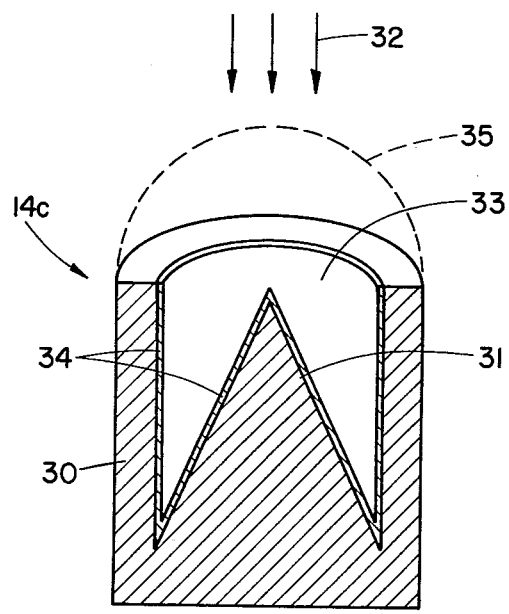

FIG. 4 illustrates a boxed or interspersed design in which the absorber 14c has the shape of a cylindrical ring 30 surrounding a pyramid 31 which has relatively steep walls. The absorber is so arranged that the sun rays 32 enter axially into the cavity 33 formed by the cylinder 30 and the pyramid 31 to thereby find the large surface area of the pyramid. The thermal radiation eminating from the surface of the pyramid impinges against the inner wall of the annular cylinder 30 and, just as well, at a higher temperature rise of the inner cylinder wall, the reflected thermal radiation therefrom can be absorbed by the pyramid. For the improved absorption of the captured energy, the absorber surface surrounding the cavity 33 can be coated with a ceramic layer 34 having a high absorption value. A radiation-permeable pane 35 formed, for instance, of quartz glass, protects the absorber surface from depositions of dust.

Figure 5:
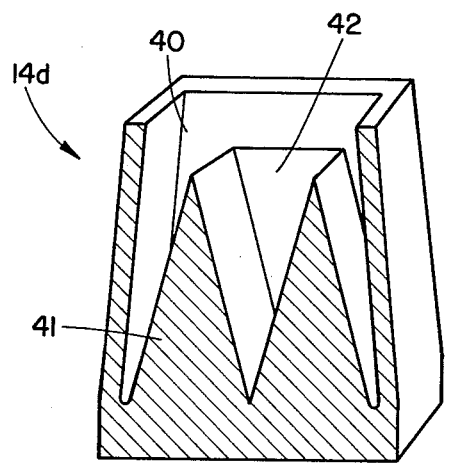

A further increase in the effective surface area can also be achieved, without an increase in the projected area set forth in FIG. 4 throgh the cross-sectional area of the cavity 33, by incorporating several pyramids in lieu of a single pyramid. FIG. 5 illustrates an absorber 14d having a cavity 40 and, arranged within the latter, a pyramid 41 of rectangular cross-section. An inverted cone 42 recessed within the pyramid 41 increases the effective area while maintaining the original projected area.

The constructions pursuant to FIGS. 4 and 5 can be so arranged within the hollow body 12 such that its opening closes off with the window 13.

Figures 6, 7:
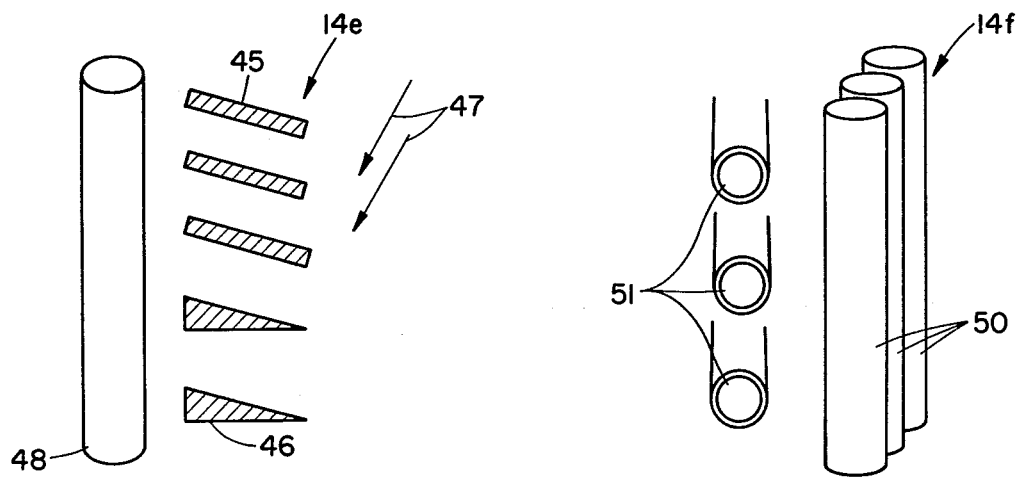

FIG. 6 illustrates an absorber 14e constructed as a grid of rods in which a plurality of spaced-apart rods of rectangular 45 or triangular 46 cross-section are arranged in parallel with each other. The sun rays 47 impinge on this grid at an angle. Behind the absorber 14e that heat carrier medium is conveyed through conduits 48 which absorb the heat radiated from the rear side of the rods 45 or 46.

A similar arrangement is illustrated in FIG. 7 wherein the absorber grid 14f consists of round rods 50, which may be either hollow or solid. The heat exchanger tubes 51 are arranged transverse to the rods 50.

Figure 8:
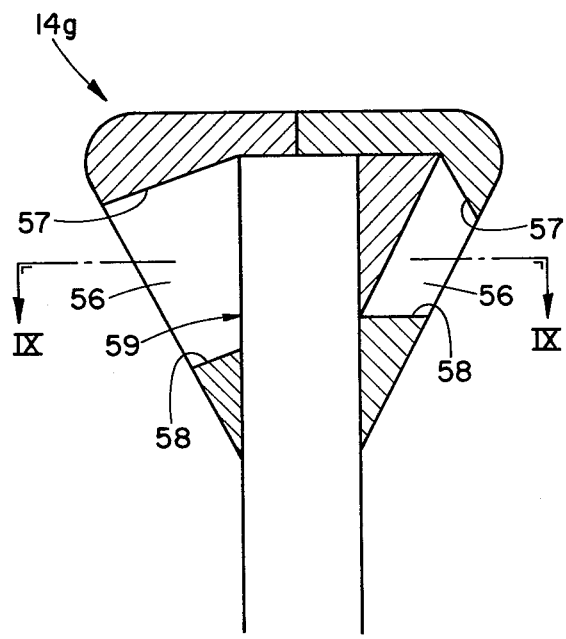
Figure 9:
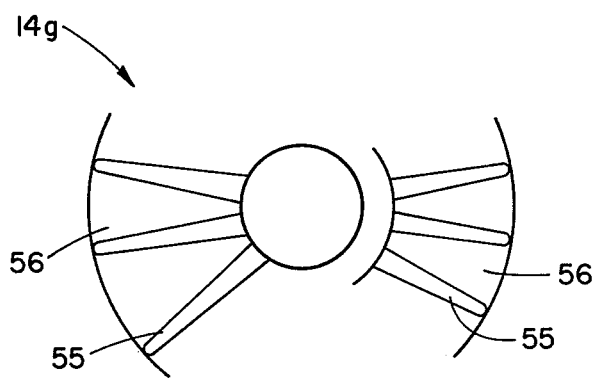
FIG. 9 is a sectional view taken along line IX—IX in FIG. 8.

A further variant of the absorber 14g is illustrated in a longitudinal section in FIG. 8, and in a cross-sectional view in FIG. 9. This absorber is constructed essentially circularly symmetrical and can be centrally built into the hollow body 12. On the sides facing towards the openings 13 there are provided ribs 55 so as to form wedge-shaped interspaces 56. These interspaces 56 are covered at an angle above and below 57 or 58.

What is claimed is:

1. A radiation receiver including a hollow body having an opening for the inlet of radiation; a ceramic absorber arranged within the hollow body for absorbing the radiant energy received through the opening and delivering the energy by radiation to a heat carrier fluid medium, at temperatures of about 1000° C., carried by conduits in the hollow body which are arranged to be radiated by the radiant energy, and said ceramic absorber on the side thereof facing towards the sun rays being constituted of a first ceramic material having low radiation emission and high radiation absorption values and on the side of the absorber facing towards the heat carrier medium being constituted of a second ceramic material having high radiation emission and low radiation absorpton values, such that said second ceramic material radiates a maximum amount of thermal radiation onto the conduits and into the fluid medium.

2. A radiation receiver as claimed in claim 1, said absorber comprising two members formed of different ceramic materials.

3. A radiation receiver as claimed in claim 1, said absorber comprising a ceramic based member; and surface layers having selected emission and absorption values applied on said base member.

4. A radiation receiver as claimed in claim 1, wherein said absorber is of at least a single-pyramid construction.

5. A radiation receiver as claimed in claim 4, said absorber being of a multiple pyramid construction.

6. A radiation receiver as claimed in claim 1, wherein said absorber is in the shape of a grid consisting of a plurality of ceramic rod-like elements in a parallel arrangement.

7. A radiation receiver as claimed in claim 6, comprising heat exchanger tubes extending in parallel to the plane of the grid-like absorber for conveying the heat carrier medium therethrough.

8. A radiation receiver as claimed in claim 1, wherein said absorber has a cavity on the side thereof facing towards the sun rays; said cavity having a plurality of interior walls oriented relative to each other so as to absorb a major portion of the heat radiated from other internal walls.

* * * * *